Feb. 19, 1957
C. GOBEL
2,781,660
FLOWMETER
Filed June 6, 1955
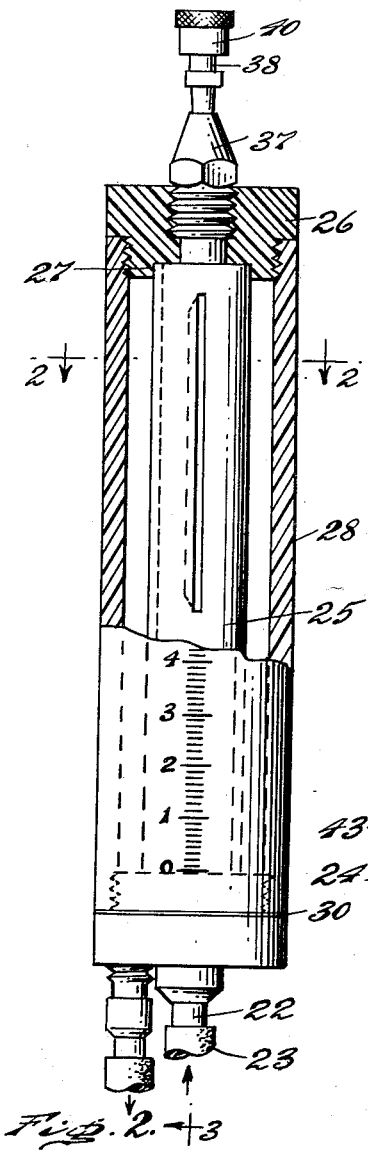
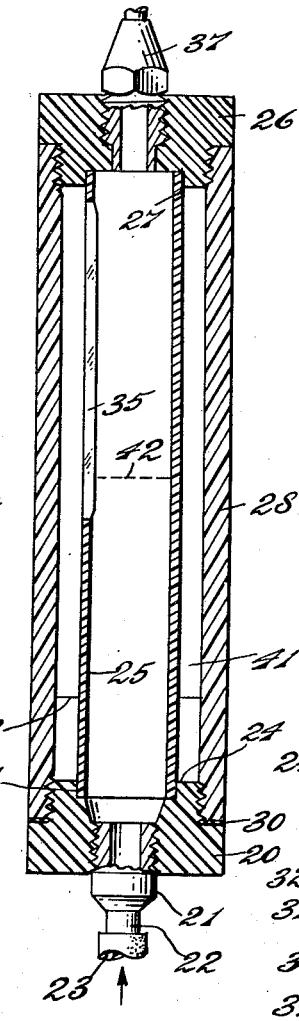
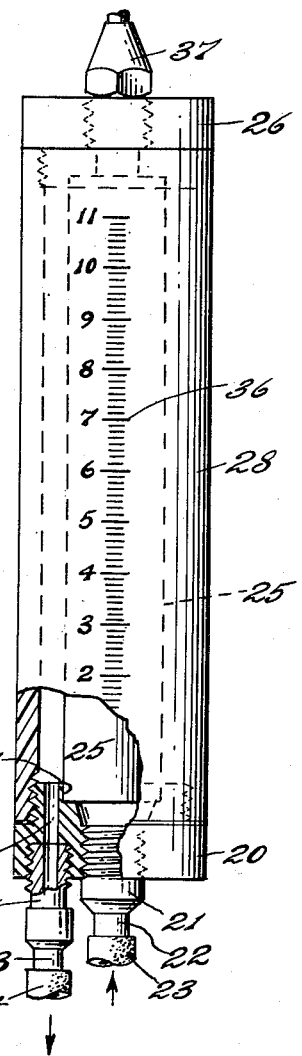
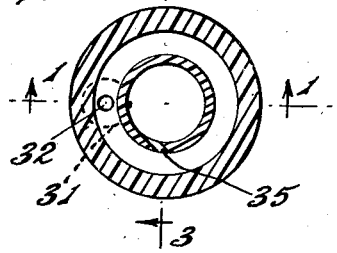
INVENTOR.
Charles Gobel
BY
ATTORNEYS.

United States Patent Office 2,781,660
Patented Feb. 19, 1957

2,781,660

FLOWMETER

Charles Gobel, Philadelphia, Pa.

Application June 6, 1955, Serial No. 513,538

2 Claims. (Cl. 73—21.5)

The present invention relates to flowmeters, especially suited for the measurement of flow in liquids which are opaque, and particularly for measuring the extracorporeal flow of animal (including human) blood.

A purpose of the invention is to obtain more accurate measurement of flow of liquids, especially opaque liquids, and particularly animal blood including human blood, by avoiding the tendency of the meniscus to vibrate up and down, by carrying the flow between inner and outer tubes in a transverse direction to the axis and preferably tangentially.

A further purpose is to avoid error due to variation in venous pressure by providing a reservoir below the slot between the inner and outer tubes which will permit substantial variation in level before backing up of flow through the slot occurs.

Further purposes appear in the specification and in the claims.

In the drawings I have chosen to illustrate one only of the numerous embodiments in which my invention may appear, selecting the form shown from the standpoints of convenience in illustration, satisfactory operation and clear demonstration of the principles involved.

Figure 1 is a front elevation of the flowmeter of the invention partly in vertical axial section on the line 1—1 of Figure 2.

Figure 2 is a transverse section of Figure 1 on the line 2—2.

Figure 3 is a vertical axial section on the line 3—3 of Figure 2.

Figure 4 is a front elevation partly broken away in vertical axial section.

Describing in illustration but not in limitation and referring to the drawings:

The measurement of flow in opaque liquids has been a serious problem. This has been particularly true in the case of the measurement of blood flowing extracorporeally, usually as an adjunct to a mechanical heart, a mechanical kidney, or some other body-assisting or blood-treating device.

I have endeavored in the past to produce an improved flowmeter by indicating the level of the liquid flowing from an inner transparent tube to an outer transparent tube through a vertical slot in the inner tube. While this type of flowmeter gives improved results, difficulties have been encountered in some cases because of the tendency of the level of the blood or other liquid in the inner tube to obscure the reading or make the readings non-reproducible by turbulence and vibration at the meniscus. In experiments conducted on extracorporeal blood flow using my previously developed flowmeter, it has been found that under some conditions and when treating some patients the meniscus constantly vibrates up and down and reading is very difficult.

I have discovered that by extending the slot transversely of the radius and preferably tangentially, this vibration and turbulent effect at the meniscus is prevented and the meniscus remains relatively quiet and smooth so that the flowmeter is easily readable. By this change in construction, variations in the level which are independent of flow are largely avoided in the inner tube.

A further difficulty has been encountered in my previously developed flowmeter which I now correct. Where the slot in the inner tube extended to the bottom of the space between the tubes, I find that change in resistance of the vein of the patient, or other output resistance change, causes the blood or other liquid to back up through the slot, changing the level in the space between the inner tube and the outer tube, and creating an error in the reading of the blood height in the inner tube. When vein resistance increased there was a tendency to increase flowmeter pressure and both the level in the inner tube and the outer tube would go up, but not proportionately.

I find that by providing a reservoir space below the slot between the inner tube and the outer tube, considerable variation in the level in this reservoir can occur below the bottom of the slot without causing any backing up into the inner tube and without causing any variation in flowmeter reading. Thus slight changes in the reservoir level no longer influence the reading.

Considering now the form shown, the device of the invention is preferably made of a transparent plastic such as methyl methacrylate or polystyrene, although it may permissibly be made of glass or other transparent material. The inlet and outlet fittings will desirably be of metal.

The device of the invention as shown comprises a bottom cap 20 receiving a preferably central threaded inlet fitting 21 having a nipple 22 which connects to an inlet rubber tube 23. The bottom cap has a central upper recess 24 which receives and seats the lower end of an inner transparent tube 25. The inner tube at the top has a tube cap 26 which has a central recess 27 which receives and seats the top of the inner tube 25.

The respective bottom and top caps thread into an outer transparent tube 28, which is desirably sealed to the bottom cap by a gasket 30.

An outlet fitting 31 threads into the bottom cap desirably at one side and communicates by bore 32 with the space between the inner tube and the outer tube. The outlet fitting has a nipple 33 which engages an outlet rubber tube 34 which suitably is connected with the vein of the patient in extracorporeal blood flow measurement.

At a position well above the bottom of the space between the tubes, the inner tube has a flow slot 35 which extends transversely to the radius and preferably tangentially as shown, thus producing the effect of stabilizing the top of the meniscus.

The outer tube is provided with a scale 36 which is calibrated in terms of flow and suitably indicates the flow level. The scale need not extend below the bottom of slot 35.

The top cap is provided with a fitting 37 threaded therein at the center and communicating to the top of the inner tube. The fitting 37 is connected with a universal connecter 38 which can connect with a syringe to pump up the pressure in the flowmeter, and when the syringe is not connected the universal fitting is suitably closed by a valve 40. The connecter is of the T type as well known in which the syringe connects beyond the valve so that the valve can close while the syringe is still connected and the syringe can be removed without losing the pressure in the flowmeter.

Between the outer and the inner tubes below the bottom of the slot 35 there is a reservoir space 41 which permits variation in level of the outgoing blood without backing up into the inner tube.

In operation of the device, blood or other liquid whose flow is to be determined enters tube 23 and flows upwardly through the bottom of inner tube 25 and then passes tangentially outwardly through flowmeter slot 35. Let us assume a particular condition of flow which causes the meniscus in the inner tube to rise to level 42. After passing through the slot 35 the blood enters reservoir 41 between the inner tube and the outer tube and let us assume a condition which causes the blood to assume a level 43 in this reservoir. The blood now flows through the outlet tube 34 to the vein.

If now the resistance in the vein increases or decreases the level 43 will change slightly without affecting the flowmeter reading. If the flow changes, level 42 will change correspondingly and the new flow rate will be read on the scale 36, suitably calibrated.

If desired the flow meter will be pressurized by pumping in air, oxygen, or inert gas through the fitting 37. Of course the flowmeter reading will be calibrated with respect to the pressure condition which is created.

In view of my invention and disclosure variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. In a flowmeter, a vertically extending inner transparent tube, a vertically extending outer transparent tube in spaced relation to the inner transparent tube, there being an annular space between the outer and inner transparent tubes, an inlet connection at the bottom of the inner transparent tube, an outlet connection at the bottom of the space between the inner and outer transparent tubes, and walls forming a slot in the side of the inner transparent tube, the slot extending longitudinally of the inner transparent tube for a substantial length and the closely adjacent side walls of the slot being angularly disposed with respect to the radius so that flow of liquid outwardly through the slot is substantially tangentially directed.

2. A flowmeter of claim 1, in which the slot extends upwardly from the bottom position spaced above the bottom of the space between the inner and outer tubes, providing a discharge reservoir below the slot.

References Cited in the file of this patent

UNITED STATES PATENTS

| | | |
|---|---|---|
| 1,983,231 | Keitel | Dec. 4, 1934 |
| 2,165,705 | Houser | July 11, 1939 |